US012186932B2

(12) United States Patent
Wu et al.

(10) Patent No.: US 12,186,932 B2
(45) Date of Patent: Jan. 7, 2025

(54) INTERNAL ROTOR TYPE NAIL DRIVE DEVICE OF ELECTRIC NAIL GUN

(71) Applicant: DE POAN PNEUMATIC CORP., New Taipei (TW)

(72) Inventors: I-Tsung Wu, New Taipei (TW); Chia-Sheng Liang, New Taipei (TW); Yu-Che Lin, New Taipei (TW); Wen-Chin Chen, New Taipei (TW)

(73) Assignee: DE POAN PNEUMATIC CORP., New Taipei (TW)

( * ) Notice: Subject to any disclaimer, the term of this patent is extended or adjusted under 35 U.S.C. 154(b) by 0 days.

(21) Appl. No.: 18/236,931

(22) Filed: Aug. 22, 2023

(65) Prior Publication Data

US 2024/0139990 A1 May 2, 2024

(30) Foreign Application Priority Data

Oct. 31, 2022 (TW) .................................. 111141339

(51) Int. Cl.
*B27F 7/11* (2006.01)

(52) U.S. Cl.
CPC ...................................... *B27F 7/11* (2013.01)

(58) Field of Classification Search
USPC .......................................................... 227/129
See application file for complete search history.

(56) References Cited

U.S. PATENT DOCUMENTS 5,320,270 A 6/1994 Crutcher
5,511,715 A 4/1996 Crutcher et al.
6,607,111 B2 8/2003 Garvis et al.
6,669,072 B2 12/2003 Burke et al.
6,755,336 B2 6/2004 Harper et al.
6,766,935 B2 7/2004 Pedicini et al.
6,796,475 B2 9/2004 Adams
6,971,567 B1 12/2005 Cannaliato et al.
6,974,061 B2 12/2005 Adams et al.
10,821,625 B1 * 11/2020 Albers .................... B27F 7/006
2009/0032567 A1 2/2009 Liang et al.
2009/0095787 A1 4/2009 Liang et al.
2010/0038394 A1 2/2010 Hlinka et al.
2021/0339361 A1 * 11/2021 Abbott ................... B25D 17/06
2023/0055687 A1 * 2/2023 Wu .......................... H02K 7/06
2023/0182276 A1 * 6/2023 Wu ......................... H02P 7/292
173/1

FOREIGN PATENT DOCUMENTS

EP 2711135 B1 7/2016

* cited by examiner

*Primary Examiner* — Praachi M Pathak
(74) *Attorney, Agent, or Firm* — Chun-Ming Shih; HDLS IPR SERVICES

(57) ABSTRACT

An internal rotor type nail drive device of electric nail gun, comprising a nailing rod and an internal rotor type rotary actuator that can output a specific rotation angle and can drive the nailing rod to move downward for nailing. Specifically, the rotary actuator comprises a stator and a rotor arranged inside the stator, even groups of electromagnetic mutual action components are configured in pairs between the stator and the rotor, to generate a tangential force to drive the rotor to rotate for a specific rotation angle, and to drive the nailing rod to move for a nailing stroke. The nailing stroke can be determined by a specific rotation angle. Thus, through the above configuration of the rotary actuator, the structure of the electric nail gun can be simplified, and the kinetic energy for nailing can be increased.

14 Claims, 7 Drawing Sheets

(Y-Y)

INTERNAL ROTOR TYPE NAIL DRIVE DEVICE OF ELECTRIC NAIL GUN

BACKGROUND OF INVENTION

1. Field of the Invention

The present invention relates generally to an electric nail gun, and more particularly to an internal rotor type nail drive device which converts electric energy into mechanical energy using an internal rotor type rotary actuator.

2. Description of Related Art

A conventional electric nail gun normally comprises a motor and an elastic component to drive the nailing rod to move downward for nailing and upward for resetting. Generally speaking, nailing rods can be divided into two types based on the mode of driving by the motor and elastic component:

One type is using a motor to drive a flywheel to rotate, and using the feature that the driven flywheel can rotate to accumulate rotational kinetic energy. The sliding base configured on the nailing rod and the flywheel are arranged to contact each other. At the moment of contact, the rotational kinetic energy accumulated by the flywheel will immediately be transmitted to the sliding base, causing the nailing rod on the sliding base to instantly output an immense linear kinetic energy, and driving the nailing rod to move downward for nailing. During the time when the nailing rod moves downward for nailing, it will cause the elastic component to accumulate the pressure to generate elastic potential energy. Based on the elastic potential energy of the elastic component, the nailing rod that has moved downward will then move upward for resetting.

Another type is using a motor to drive the nailing rod that has moved downward for nailing to move upward for resetting. During the process of resetting, the elastic component will accumulate pressure to generate elastic potential energy and the time to release the elastic potential energy can be controlled to convert it into kinetic energy that drives the nailing rod to move downward for nailing.

However, in the above two types of electric power driving modes to drive the nailing rod, the motor cannot directly control the reciprocating motion of the nailing rod based on the nailing stroke. The rotary power output from the motor must be converted by an energy converting mechanism to kinetic energy for nailing. As a result, the structure of the electric nail gun becomes too complicated. Therefore, an improvement is needed to solve this problem.

In view of the above problem, the inventor of the present invention has published a patent documented as US20230055687A1—"Nail Drive Device of Electric Nail Gun", which discloses an external rotor type rotary actuator to effectively overcome the disadvantage of the aforementioned conventional nailing driving technique, with clear descriptions.

SUMMARY OF THE INVENTION

The object of the present invention is to solve the problem that the motor configured on the conventional electric nail gun cannot directly control the reciprocating motion of the nailing rod based on the nailing stroke by providing an effective strategy for improvement. Specifically, facing the prospect of the technology of the aforementioned external rotor type nail drive device, the present invention discloses another technique embodied in an internal rotor type nail drive device. Both techniques can simplify the structure of the conventional electric nail gun. Comparing to the aforementioned external rotor type nail drive device, the present invention can further enhance the efficiency of power output for nailing, given the limited configuration space inside the gun body and limited power supply.

Based on the above technique, the internal rotor type nail drive device disclosed in the present invention specifically comprises a nailing rod and an internal rotor type rotary actuator that can output a specific rotation angle. The nailing rod is slidably configured inside the machine body along a nailing axis, and one end of the nailing rod is formed with a transmission part. The internal rotor type rotary actuator comprises a stator fixed inside a machine case, and a rotor rotatably configured inside the stator in a concentric manner Between the stator and the rotor, even groups of electro-magnetic mutual action components are configured in pairs to generate electricity and a magnetic field for interaction. Each group of the electro-magnetic mutual action components comprises a wire bundle that can generate effective magnetic fields of the same current direction, and a magnetic plate that can generate lines of magnetic force to induce mutual action with the wire bundle.

Based on the above description, the necessary problem-solving technical feature of the present invention includes the following: The stator is fixed, and the rotor is rotatably configured inside the stator in a concentric manner (i.e., internal rotor type). The rotor is formed with a power output end, and the power output end is connected with the transmission part of the nailing rod. Two neighboring wire bundles can respectively generate electric currents in opposite directions, and two neighboring magnetic plates can respectively generate lines of magnetic force in opposite polarities so that the two neighboring electro-magnetic mutual action components can work together to generate tangential forces in the same rotation direction, to drive the rotor to rotate for a specific rotation angle, and through the power output end and the transmission part, to drive the nailing rod to move for a nailing stroke along an axial nailing direction.

Based on the above design, the present invention substitutes the motor configured inside the conventional nailing machine with the internal rotor type rotary actuator, and according to the preset nailing stroke, a specific rotation angle for the rotary actuator can be planned to directly drive the nailing rod to move for the preset nailing stroke. Moreover, based on such an implementation, the present invention can use general input current and voltage control to directly control a specific rotation angle for the output of the rotary actuator to act as the nail drive power source. Therefore, the present invention can eliminate unnecessary installations on the electric nail gun and simply the structure of the electric nail gun.

Further, as the rotary actuator in the present invention adopts an internal rotor type design, i.e., the rotor that can generate a tangential force in a specific rotation angle is configured inside the stator, comparing to technique disclosed in the prior patent filed by the inventor of the present invention—Taiwan Patent No. TWI791263B (i.e., disclosing an external rotor type rotary actuator), because the radius of the internal type rotor is relatively small, according to the equations [$T=I\times\alpha$], [$I=mr^2$], and [$F=ma$] (specifically: T is torque, I is rotational inertia, $\alpha$ is angular acceleration, m is mass, r is radius, F is tangential force): when the torque T output by the rotor is a fixed value, a smaller radius r of the rotor means more concentration of the mass to the center of rotation, reduced rotational inertia I of the rotor ($r^2$ is proportional to I) and increased angular acceleration α (I is inversely proportional to α). Thus, with limited configuration space inside the gun body and limited specific electric power supply, the tangential speed output from the rotor can be increased to enhance the efficiency of nailing power output.

Further, in other embodiment details, the magnetic plate in each group of the electro-magnetic mutual action components has an arc length for diffusing the lines of magnetic force, the specific rotation angle is defined by the effective magnetic field generated by the wire bundles in each group of the electro-magnetic mutual action components and the arc length of the magnetic plate, and the nailing stroke is determined by the specific rotation angle.

In other embodiment details, said even number of wire bundles are respectively configured inside the stator at intervals along the direction of a normal line of the stator, said current direction is perpendicular to said normal line. In further embodiment details, said even number of wire bundles are formed by winding a wire, the inside of the stator is formed with a flux-guide hole and even number of open type hub slots are distributed around the flux-guide hole, through the flux-guide hole, the wire is wound inside the two neighboring hub slots to form at least one coil, said even number of wire bundles are respectively formed by filling at least one of the coils inside two neighboring hub slots. Said even number of magnetic plates are fixed on the external wall of the rotor in a way that they can respectively induce mutual action with the direct current generated by the wire bundles in the direction of their respective normal lines. Specifically, the arc length of the magnetic plate in the direction of the normal line of the stator is larger than, equal to, or less than the arc length of the specific rotation angle.

According to the above descriptions, as the stator of the internal rotor type rotary actuator in the present invention is configured on the periphery of the rotor, the space between the hub slots for winding the wire is relatively larger than the hub slots of the stator of the aforementioned external rotor type rotary actuator. Therefore, the present invention allows thicker enameled wires of more rounds to be wound inside the hub slots. According to the equation [V=IR] (specifically: V is voltage, I is current, R is resistance): Under a specific voltage, larger diameter of the enameled wire can help reduce resistance and increase electric current to be conducted, thus increasing the tangential force output from the rotor and enhancing the efficiency of nailing power output. When more rounds of or denser enameled wires are wound, the strength of the magnetic field can be increased to produce larger tangential force. This will also enhance the efficiency of nailing power output.

In other embodiment details, the power output end is a swing arm or a sectorial gear disc. When the power output end is a swing arm, the two ends of the swing arm are respectively formed with a fixed connection part and a pivotal connection part, the swing arm is fixed on a power output end of the rotor through the fixed connection part, and the swing arm is connected to the transmission part of the nailing rod through the pivotal connection part. When the power output end is a sectorial gear disc, the transmission part of the nailing rod is formed as a gear rack, the two ends of the sectorial gear disc are respectively formed with a fixed connection part and a sectorial tooth part, the sectorial gear disc is fixed on the external wall of the rotor through the fixed connection part, and the sectorial gear disc meshes with the gear rack through the sectorial tooth part.

In other embodiment details, especially for the resetting motion after the nailing rod has moved for the nailing stroke, the power to reset the nailing rod can be provided by an elastic component or directly by the rotary actuator. In particular:

In one preferred embodiment that uses an elastic component to provide said resetting power, the elastic component can be connected between the machine body and the power output end, or alternatively, the elastic component can be connected between the machine body and the nailing rod so that the elastic component generates an elastic force when the nailing rod moves for the nailing stroke, and the elastic force drives the nailing rod to reset along the axial nailing direction.

In one preferred embodiment that uses a rotary actuator to provide said resetting power, the two ends of said wire can conduct a forward current and a backward current from time to time, the forward current is used to drive the nailing rod for nailing, and the backward current is used to drive the nailing rod for resetting.

In another preferred embodiment that uses a rotary actuator to provide said resetting power, each group of wire bundles contain a nailing wire bundle and a resetting wire bundle, said coil comprises at least one nailing coil, at least one resetting coil, and two neighboring hub slots for said nailing coil and said resetting coil to be wound together, thus forming a nailing wire bundle and a resetting wire bundle in each of the hub slots. Said nailing coil is formed by serially connecting and winding a nailing wire, while said resetting coil is formed by serially connecting and winding a resetting wire. The two ends of the nailing wire can conduct a forward current to drive the nailing rod for nailing, while the two ends of the resetting wire can conduct a backward current to drive the nailing rod to reset.

In other embodiment details, the inside of the machine body is further fixed with a stopper to limit the swing angle of the rotor.

According to the above descriptions, apart from using an internal rotor type rotary actuator to provide a specific rotation angle needed by the nailing stroke, the present invention also provides multiple functional implementations, including: (1) The rotary actuator solely drives the nailing rod to move downward for nailing, and an elastic component is combined to drive the nailing rod to move upward for resetting. (2) The rotary actuator drives the nailing rod to move downward for nailing and to move upward for resetting. (3) Based on the equal circumference relative position provided between the stator and rotor of the rotary actuator, the configuration number of the even groups of electro-magnetic mutual action components and the arc length of the magnetic plates can be controlled to define a specific rotation angle needed for the nailing stroke. Thus, the internal rotor type rotary actuator provided by the present invention can be appropriately applied in electric nail guns to replace conventional motors and unnecessary complicated structures so as to simplify the structure of electric nail guns and to enhance the accuracy of motion positions when the nailing rod moves downward for nailing and upward for resetting as well as the efficiency of nailing power output.

The features and technical effects of the disclosed embodiments are reflected in the following descriptions and illustrations.

DETAILED DESCRIPTION OF THE INVENTION

Figure 1:
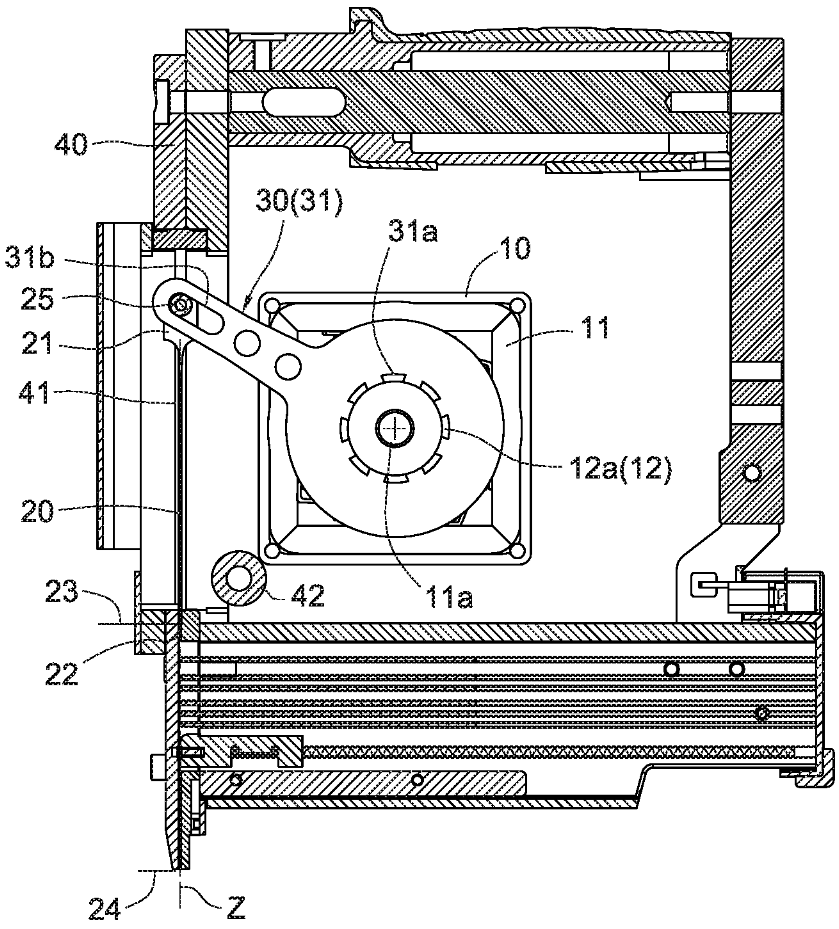
FIG. 1 is a sectional view of a preferred embodiment of the present invention of a nail drive device.

FIG. 1 discloses the configuration details of a preferred embodiment of the present invention, showing the internal rotor type nail drive device of the present invention of electric nail gun comprises a nailing rod 20 slidably configured inside a machine body 40 of the electric nail gun, and an internal rotor type rotary actuator 10 fixed on the machine body 40 as the fixed end. Specifically:

One side of the machine body 40 is configured with a guide slot 41 arranged along a nailing axis Z so that the nailing rod 20 can be slidably configured inside the guide slot 41 of the machine body 40 to move along the axial nailing direction Z downward for nailing and upward for resetting. In the example shown in FIG. 1 of the present invention, said axial nailing direction Z is a vertical direction. One top end of the nailing rod 20 is formed with a transmission part 21 for connection with the output end of the rotary actuator 10, and one bottom end of the nailing rod 20 is used as an impact part 22 to shoot the nail. In this way, through a specific rotation angle (to be detailed later) output by the internal rotor type rotary actuator 10, the nailing rod 20 can be driven to have reciprocating motions along the axial nailing direction Z so that the impact part 22 can move along the axial nailing direction Z from a first position 23 before nailing downward to a second position 24 after nailing, and then move from the second position 24 upward to the first position 23 for resetting.

Figure 2:
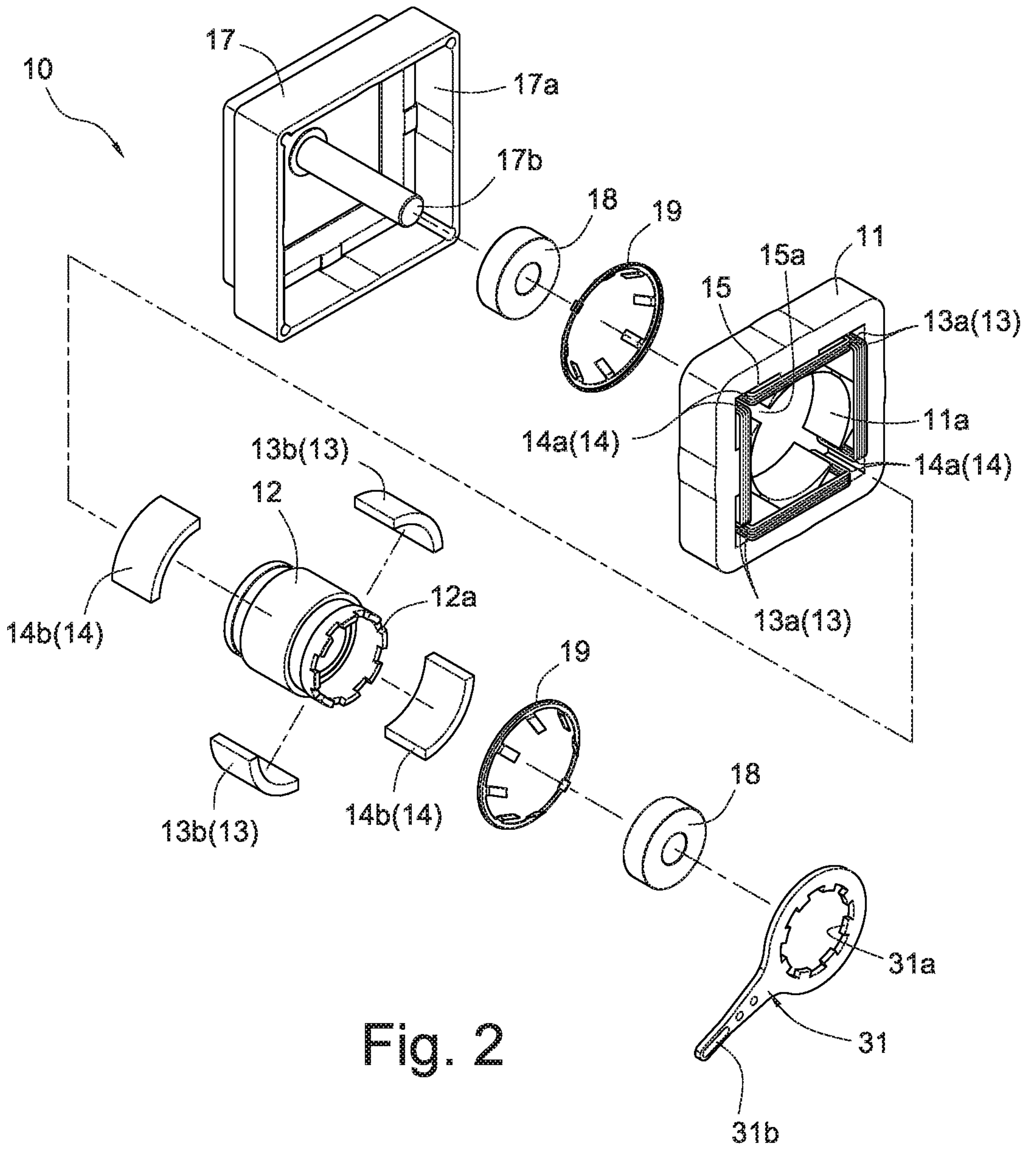
FIG. 2 is an exploded perspective view of the rotary actuator depicted in FIG. 1.
Figure 3:
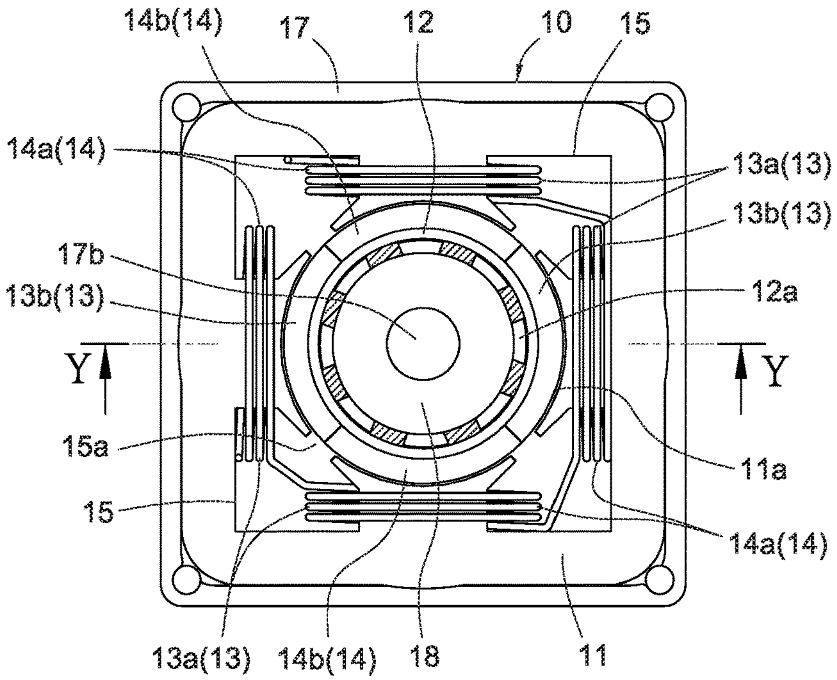
FIG. 3 is a front view of FIG. 2.
Figure 4:
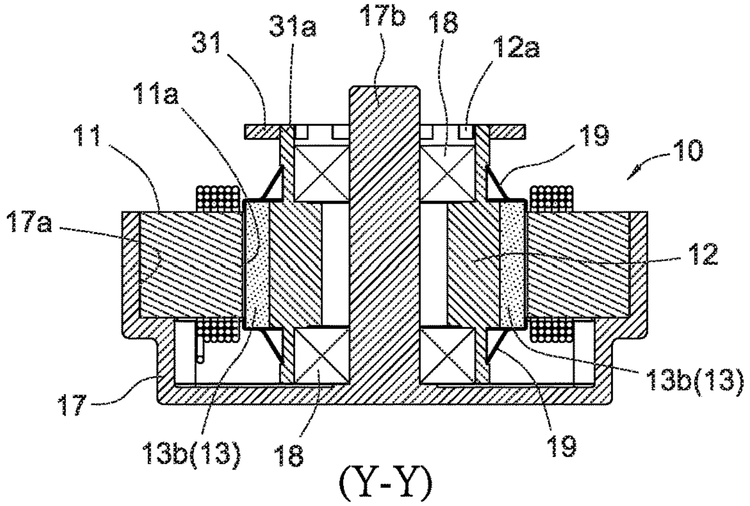
FIG. 4 is a Y-Y sectional view of FIG. 3.

Referring to FIG. 2 to FIG. 4, said internal rotor type rotary actuator 10 is a motor or electric machine that can rotate for a specific rotation angle. Details are provided below.

Referring to FIG. 2, the rotary actuator 10 comprises a stator 11, a rotor 12, and even groups of electro-magnetic mutual action components 13, 14 mounted inside a machine case 17. The machine case 17 has a rectangular holding slot 17*a*. The machine case 17 is also formed with a positioning column 17*b* that extends from inside the holding slot 17*a*. The stator 11 is made into a frame pattern that can be fitted inside the rectangular holding slot 17*a* so that the stator 11 can be fixed inside the holding slot 17*a* of the machine case 17 (see FIG. 3 and FIG. 4).

Referring to FIG. 2, the inside of the stator 11 is formed with a round flux-guide hole 11*a* and even number of open type hub slots 15 distributed on the periphery of the flux-guide hole 11*a*. In addition, as can be seen from FIG. 4, the positioning column 17*b* of the machine case 17 can go through the flux-guide hole 11*a*.

Referring to FIG. 2, the rotor 12 is made into a cylindrical shape and is formed with multiple internal walls and external walls of different diameters. Furthermore, as can be seen from FIG. 2 and FIG. 4, an appropriate number of bearings 18 can be configured between the inner wall of the rotor 12 and the positioning column 17*b* of the machine case 17, so that the rotor 12 can be pivoted on the motionless positioning column 17*b* to rotate freely and be rotatably configured inside the stator 11 in a concentric manner More precisely, the rotor 12 is rotatably configured inside the flux-guide hole 11*a* of the stator 11 in a concentric manner. In addition, the external walls on both ends of the rotor 12 are respectively configured with a retaining ring 19 (to be detailed later).

Said even groups of electro-magnetic mutual action components 13, 14 are configured in pairs and at intervals between the stator 11 and the rotor 12 along the equal circumference direction. More specifically, said even groups of electro-magnetic mutual action component 13, 14 are configured in pairs and at intervals between the hub slot 15 of the stator 11 and the external wall of the rotor 12 so as to respectively generate electricity and a magnetic field for interaction, and to subsequently drive the rotor to rotate for a specific rotation angle θ (to be detailed later).

Figure 5:
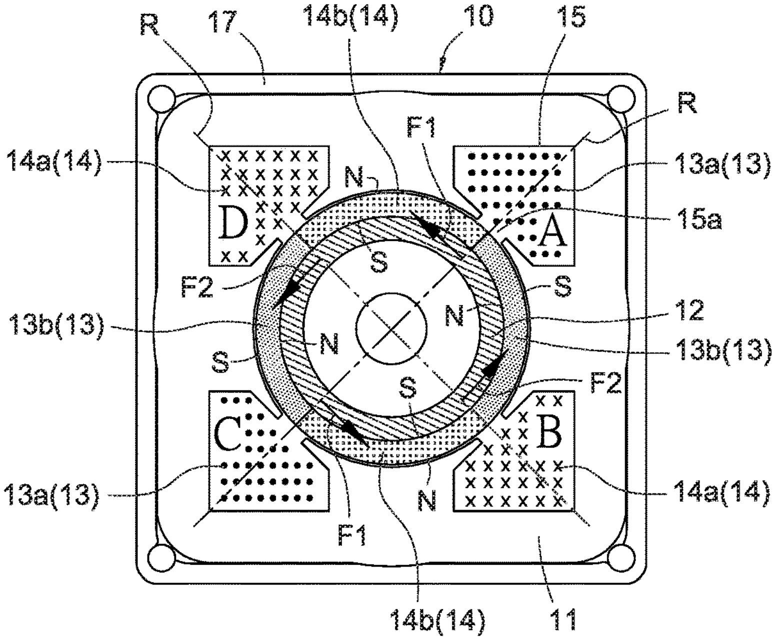
FIG. 5 is a motion explanation view of FIG. 3, explaining how the electro-magnetic mutual action component drives the rotation of the rotor.
Figure 6A:
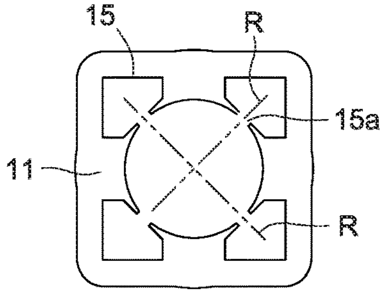
FIG. 6*a* is a structural view of the stator depicted in FIG. 3.
Figure 6B:
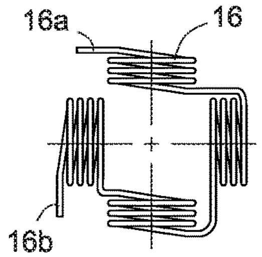
FIG. 6*b* is a structural view of the coil depicted in FIG. 3.

Referring to FIG. 5, the even number of said hub slots 15 can actually be formed inside the stator 11 at intervals of 90 degrees in relative position. There are four hub slots 15 to configure four groups of electro-magnetic mutual action components 13, 14—A, B, C, D, and each group of electro-magnetic mutual action components 13, 14 respectively has a wire bundle and a magnetic plate configured as a pair. Specifically, Group A and Group C electro-magnetic mutual action components respectively have a first wire bundle 13*a* and a first magnetic plate 13*b* configured as a pair, and Group B and Group D electro-magnetic mutual action components respectively have a second wire bundle 14*a* and a second magnetic plate 14*b* configured as a pair. Thus, four wire bundles and four magnetic plates are configured to form four pairs (see FIG. 2 and FIG. 3). More specifically:

The stator 11 is defined with four normal lines R radiating from the circle center, dividing the equal circumference into four parts by an equal angle of 90 degrees. Said paired first wire bundles 13*a*, second wire bundles 14*a* are respectively configured inside the stator 11 at intervals along the directions of said normal lines of the stator. Furthermore, a hub slot 15 is respectively configured along the directions of the four normal lines R inside the stator 11. Thus, the four hub slots 15 can be distributed at equal intervals on the periphery of the stator 11 in circumference directions. Each hub slot 15 has an open type slot opening 15*a* (see FIG. 6*a*) formed on the stator 11 along the directions of the normal lines R and connected with the flux-guide hole 11*a*. Each slot opening 15*a* is used for implanting the enameled wire into each of the hub slots 15. Furthermore, between the four hub slots 15, a single enameled wire can be wound in serial connection to form four coils 16 (see FIG. 6*b*). A positive terminal 16*a* and a negative terminal 16*b* on the two ends of said single wire are respectively connected to the battery of the nailing machine (not shown in the figure). In addition, said first magnetic plate 13*b*, second magnetic plate 14*b* are both made into an arc plate, and are fixed on the external wall of the rotor 12 (see FIG. 5) in a manner that they can respectively induce mutual action with the direct current generated by the first wire bundle 13*a* and second wire bundle 14*a* in the direction of their respective normal lines. Furthermore, the retaining rings 19 on the external wall on both ends of the rotor 12 can limit the first magnetic plate 13*b* and second magnetic plate 14*b* so that they will not get loose. Based on such an implementation, the first wire bundle 13*a* in Group A and Group C electro-magnetic mutual action components and the second wire bundle 14*a* in Group B and Group D electro-magnetic mutual action components disclosed in FIG. 5 are respectively formed by a part of the two coils 16 shown in FIG. 6*b*. In other words, the walls of the two neighboring hub slots 15 in FIG. 6*a* can be used for a coil 16 to be implanted from the slot opening 15*a* for winding so that each hub slot 15 holds a part of the wires of two coils 16, thus forming the wire bundle inside each of the hub slots (see FIG. 3, FIG. 5).

Figure 6C:
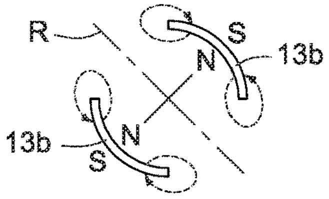
FIG. 6*c* is a schematic view of the first magnetic plates of the Group A and Group C electro-magnetic mutual action components depicted in FIG. 3.

Specifically, as shown in see FIG. 6*c*, two first magnetic plates 13*b* are respectively configured opposite each other along the directions of their respective normal lines R. Moreover, in both cases, the internal surface is configured as N pole, and the external surface is configured as S pole, so that lines of magnetic force (indicated by dotted lines in FIG. 6*c*) diffusing from inside toward outside are applied to the first wire bundle 13*a*. In other words, the lines of magnetic force of the two first magnetic plates 13*b* diffuses from the internal surface toward the external surface.

Figure 6D:
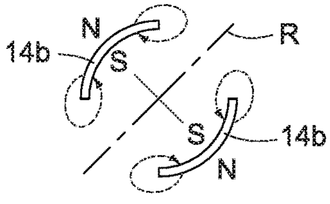
FIG. 6*d* is a schematic view of the second magnetic plates of the Group B and Group D electro-magnetic mutual action components depicted in FIG. 2.

Furthermore, as shown in FIG. 6*d*, except that the two second magnetic plates 14*b* are configured in opposite directions along the directions of their respective normal lines R, they are configured to be relative to the two first magnetic plates 13*b* in FIG. 6*c* at intervals. The two second magnetic plates 14*b* are both configured to use the external surface as N pole and internal surface as S pole to respectively apply lines of magnetic force (indicated by dotted lines in FIG. 6*d*) diffusing from outside toward inside to the second wire bundles 14*a*. In other words, the lines of magnetic force of the two second magnetic plates 14*b* both diffuse from the external surface toward the internal surface. Based on such a structural design, the two neighboring first magnetic plate 13*b* and second magnetic plate 14*b* respectively generate lines of magnetic force in opposite polarities (see FIG. 5).

Further referring to FIG. 5, the first wire bundles 13*a* opposite each other along their respective normal lines R in Group A and Group C electro-magnetic mutual action components shown in FIG. 2 can both conduct electric currents in the same direction from inside the paper toward outside the paper (in FIG. 5, the electric current direction is indicated by "."), and the second wire bundles 14*a* opposite each other along their respective normal lines R in Group B and Group D electro-magnetic mutual action components can both conduct electric currents in the same direction from outside the paper toward inside the paper (in FIG. 5, the electric current direction is indicated by "x"). Thus, the two neighboring first wire bundles 13*a* and second wire bundles 14*a* can respectively generate electric currents in opposite directions. Moreover, according to Ampere right-hand rule, the directions of the electric currents generated respectively by the first wire bundles 13*a* and second wire bundles 14*a* are perpendicular to their respective normal lines R. Based on such a structural configuration, the first wire bundles 13*a* in Group A electro-magnetic mutual action components can generate electric current in the same "." direction, and accordingly the paired first magnetic plates 13*b* can generate lines of magnetic force diffusing from the internal surface N pole toward the external surface S pole. According to Ampere right-hand rule, the Group A electro-magnetic mutual action components can produce tangential forces F1 in anti-clockwise rotation directions to drive the rotor 12 to rotate anti-clockwise. Moreover, the second wire bundle 14*a* in the Group B electro-magnetic mutual action components can generate electric currents in the same "x" directions, and accordingly the paired second magnetic plates 14*b* can generate lines of magnetic force diffusing from the external surface N pole toward the internal surface S pole. According to Ampere right-hand rule, the Group B electro-magnetic mutual action components can also produce tangential forces F2 in anti-clockwise rotation directions. Specifically, the intensities of the tangential forces F1, F2 are equal and the directions of rotation produced are both anti-clockwise so as to simultaneously drive the rotor 12 to rotate anti-clockwise for the specific rotation angle.

Figure 7A:
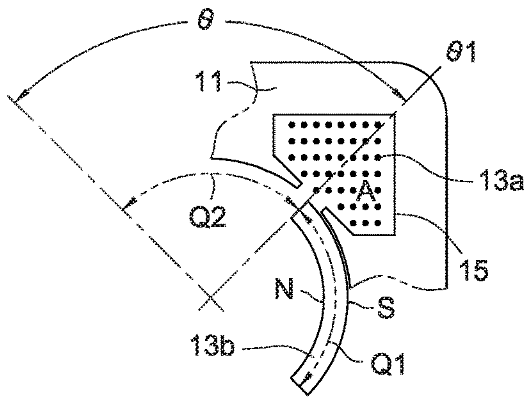
FIG. 7*a* to FIG. 7*e* sequentially illustrate the angle positions when the magnetic plates in FIG. 5 are in specific rotation angles.
Figure 7B:
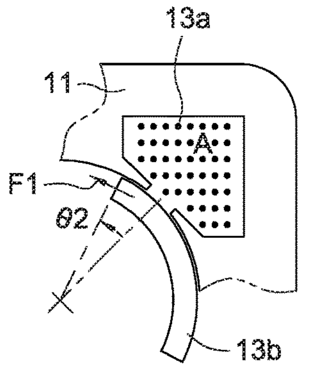
Figure 7C:
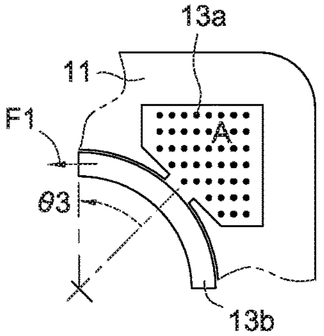
Figure 7D:
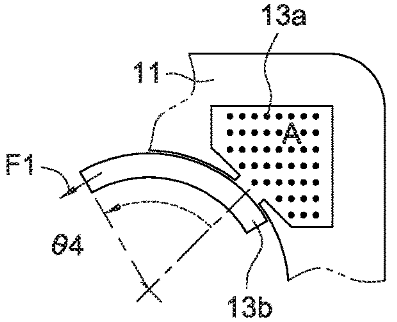
Figure 7E:
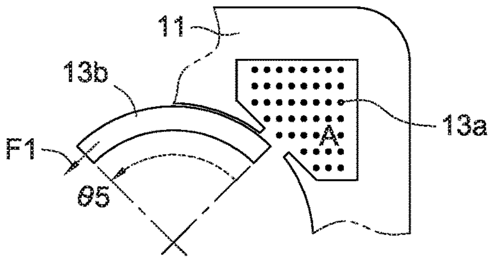

Referring to FIG. 7*a*, the first wire bundle 13*a* and the first magnetic plate 13*b* in Group A electro-magnetic mutual action components are used as an example for explanation. The first wire bundle 13*a* inside the hub slot 15 can generate an effective magnetic field toward the outside along the direction of the normal line R (i.e., toward the first magnetic plate 13*b*). Moreover, said first magnetic plate 13*b* has an arc length of the magnetic plate Q1 for diffusing lines of magnetic force. The aforementioned specific rotation angle θ itself has a specific rotation angle arc length Q2. The specific rotation angle θ can be determined by the effective magnetic field generated by the first wire bundle 13*a* and the magnetic plate arc length Q1. More specifically, in the implementations shown in FIG. 1 to FIG. 7*f*, when indicated by the expanded linear distance, the definitions can be: "the arc length of the magnetic plate Q1≥the specific rotational angle arc length Q2>0". Specifically, the specific rotational angle arc length Q2 is the length of the central arc line of the magnetic plate within the specific rotation angle θ.

It is to be noted that the present invention is not limited by the above descriptions. Furthermore, when electrified, the coil 16 can cause the stator 11 to have magnetic induction to drive the first magnetic plate 13*b* to rotate for a specific rotation angle. Therefore, along the directions of the normal lines R of the stator 11, said arc length of the magnetic plates Q1 can be larger than, equal to, or less than the arc length of the specific rotation angle Q2. All such implementations are covered by the spirit and technical scope of the present invention.

Referring collectively to FIG. 7*a* to FIG. 7*e*, the variations of rotation angles of the first magnetic plate 13*b* of the present invention after induction by the first wire bundle 13*a* are depicted in sequential order. Specifically, FIG. 7*a* discloses an initial first angle position θ1 of the first magnetic plate 13*b* before rotation. Then, FIG. 7*b* to FIG. 7*e* sequentially disclose a second angle position θ2 (see FIG. 7*b*), a third angle position θ3 (see FIG. 7*c*), a fourth angle position θ4 (see FIG. 7*d*), and a fifth angle position θ5 (see FIG. 7*e*) the first magnetic plate 13*b* is rotated to after induction by the magnetic field generated by the first wire bundle 13*a*. Specifically, the first angle position θ1 (see FIG. 7*a*) is the starting point of the rotation angle, while the fifth angle position θ5 (see FIG. 7*e*) is the final point of the rotation angle.

Figure 7F:
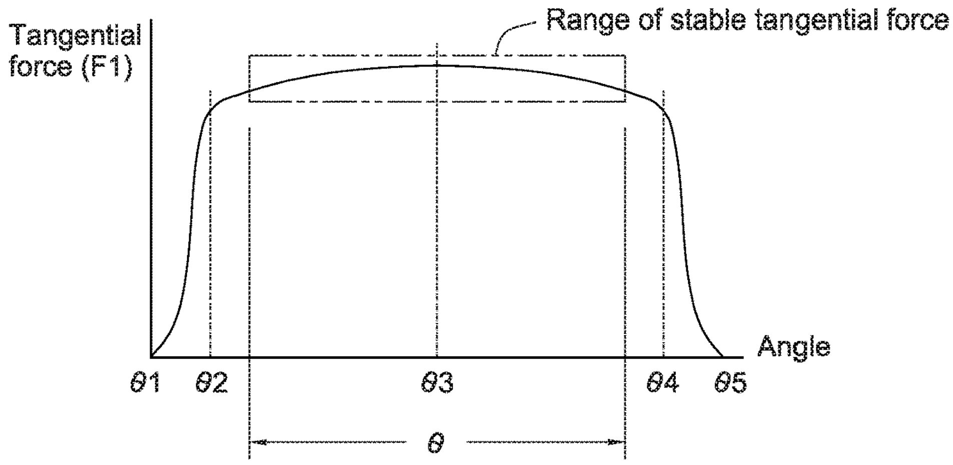
FIG. 7*f* is a line graph showing how the magnetic plates generate tangential forces during the rotation processes depicted in FIG. 7*a* to FIG. 7*e*.

Further referring to FIG. 7*f*, during the process from FIG. 7*a* to FIG. 7*e*, the first magnetic plate 13*b* is rotated from the first angle position θ1 where tangential force F1 is 0 to the second angle position θ2, the tangential force F1 will increase instantly to drive the rotor 12 to rotate in a high speed. Then, when the first magnetic plate 13*b* is rotated from the second angle position θ2 to the third angle position θ3, the tangential force F1 reaches its maximum. Then, when the first magnetic plate 13*b* is rotated from the third angle position θ3 to the fourth angle position θ4, the tangential force F1 is slightly decreased. When it is rotated from the fourth angle position θ4 to the fifth angle position θ5, the tangential force F1 is decreased rapidly to θ. Therefore, according to the present invention, when the first magnetic plate 13*b* is rotated form the second angle position θ2 to the fourth angle position θ4, the first magnetic plate 13*b* can output stable tangential force F1. As such, the present invention can use the rotation angle matching the "stable tangential force range" as the aforementioned specific rotation angle θ of the present invention to enhance the speed of the nailing rod 20 when moving downward for a nailing stroke L (see FIG. 8) as well as enhancing the quality rate of nailing.

Figure 8:
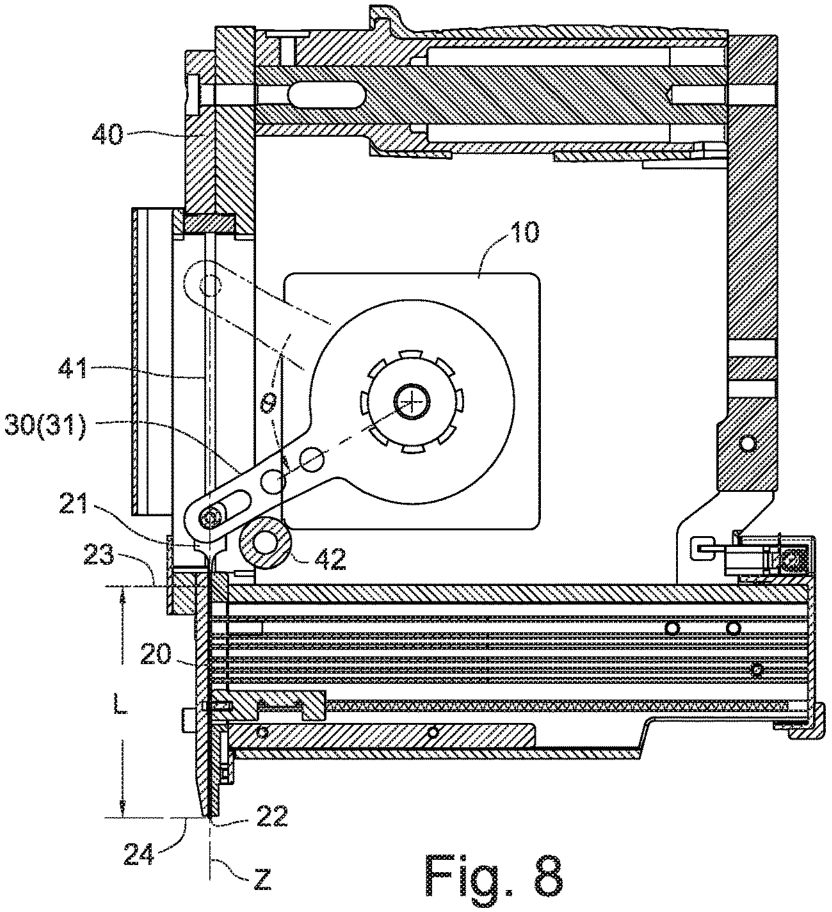
FIG. 8 is a sectional view showing how the nail drive device FIG. 1 drives the nailing rod to move downward for nailing.

Based on the above descriptions, now referring collectively to FIG. 1, FIG. 5, and FIG. 8, because the first magnetic plate 13*b* and the second magnetic plate 14*b* can be driven to rotate for the specific rotation angle θ in the same anti-clockwise rotation direction, the rotor 12 in FIG. 5 provided for fixation of the first magnetic plate 13*b* and second magnetic plate 14*b* can also be driven to rotate for the specific rotation angle θ in the anti-clockwise rotation direction (see FIG. 8). In addition, as shown in FIG. 1, the rotor 12 is formed with a power output end 30 so that the rotor 12 can be connected with the transmission part 21 of the nailing rod 20 through the power output end 30. When rotor 12 is driven to rotate for the specific rotation angle θ, it will drive the nailing rod 20 to move for a nailing stroke L along the axial nailing direction Z sequentially through the power output end 30 and the transmission part 21. Thus, based on the preset requirement for the nailing stroke L, and through reversed planning, the present invention can set the aforementioned feature and specifications of the specific rotation angle θ and matching stator 11, rotor 12, and even groups of electro-magnetic mutual action component 13.

Referring to FIG. 1 and FIG. 2, the power output end 30 can be implemented as a swing arm 31. Furthermore, the two ends of the swing arm 31 can respectively be formed with a fixed connection part 31*a* and a pivotal connection part 31*b*. The swing arm 31 can be fixed on one end of the rotor 12 through the fixed connection part 31*a*. In one preferred embodiment, the fixing ends of the fixed connection part 31*a* and the rotor can respectively be made into the form of spline teeth for stable meshing. In addition, the pivotal connection part 31*b* is configured with a stroke hole, and accordingly, the transmission part 21 of the nailing rod 20 can be made with a pivotal hole so that a pivot shaft 25 can be fitted between the pivotal connection part 31*b* of the swing arm 31 and the transmission part 21 of the nailing rod 20. In this way, when the swing arm 31 is driven by the rotor 12 to rotate for a specific rotation angle θ, the rotational kinetic energy can be converted to linear kinetic energy for the nailing rod 20 to move downward for nailing.

Figure 9:
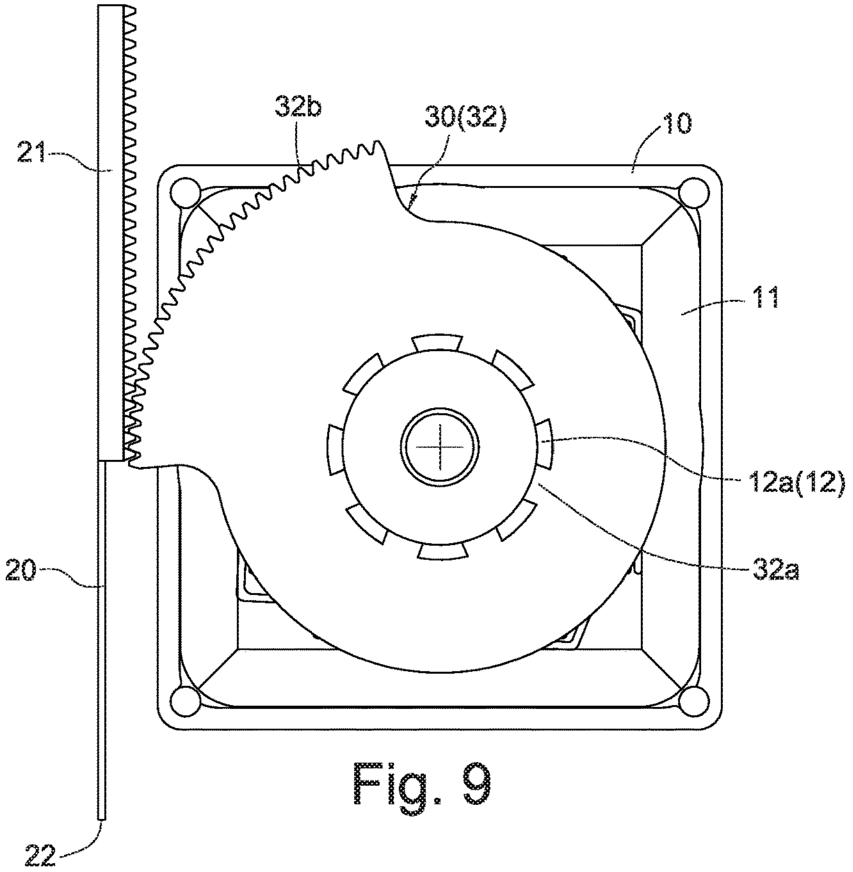
FIG. 9 is a configuration view of another embodiment of the present invention of nail drive device.

Further referring to FIG. 9, the aforementioned power output end 30 can be implemented as a sectorial gear disc 32. Furthermore, the two ends of the sectorial gear disc 32 are formed with a fixed connection part 32*a* and a tooth part 32*b*, and accordingly, the transmission part 21 of the nailing rod 20 is made in the form of a gear rack. The sectorial gear disc 32 can be fixed on the ring-shaped external wall of the rotor 12 through the fixed connection part 32*a*, and the tooth part 32*b* of the sectorial gear disc 32 can mesh with the gear rack of the nailing rod 20 (transmission part 21). In this way, when the sectorial gear disc 32 is driven by the rotor 12 to rotate for a specific rotation angle θ, through the meshing between the tooth part 32*b* and the gear rack (i.e., transmission part 21 of the nailing rod 20), the rotational kinetic energy can be converted into linear kinetic energy for the nailing rod 20 to move downward for nailing.

Based on the above structural design of the present invention, the driving mode for the nailing rod 20 to move downward for nailing can be planned. Moreover, the present invention further comprises the following three optional types of driving mode for the nailing rod 20 to move upward for resetting:

First type: In the above embodiments of the present invention, no matter the number of winding rounds of the coil 16 is four or one, the direction can be shifted by exchanging the positive and negative poles of the power supply applied to the two terminals of the single wire winding the coil 16 from time to time (i.e., in different time sections), without changing the above configuration features of the rotary actuator 10. More specifically, using the forward current before exchanging the positive and negative poles to drive the rotary actuator 10 to output the aforementioned anti-clockwise rotation to drive the nailing rod 20 to move downward for nailing, and using the backward current after exchanging the positive and negative poles to drive the rotor to rotate clockwise to drive the nailing rod 20 to move upward for resetting. In FIG. 5, when the directions of the electric current flowing in the wire bundles are changed from "." to "x", i.e., when the positive and negative poles of the power source applied on the two terminals of the wire are shifted, without exchanging the N and S poles of the magnetic plate, the rotor 12 can be driven to rotate clockwise for the specific rotation angle θ to drive the nailing rod 20 to move upward along an axial nailing direction Z for resetting.

Second type: Using the coil winding method described above, the coil 16 wound in the hub slot 15 of each stator can be specially used as a nailing coil, and each first wire bundle 13*a* and second wire bundle 14*a* can be specially used as a nailing wire bundle. In addition, inside the hub slot 15 of the stator 11, another a wire can be used, and in the same serial connection and winding method, can be wound to form another coil for resetting (like the coil shown in FIG. 6*b*). The resetting coil can be wound inside each hub slot 15 to act as a resetting wire bundle (not shown in the figure) to specially provide a backward current to drive the nailing rod 20 to move upward for resetting. Thus, when a backward current with positive and negative poles exchanged is applied to the resetting wire bundle, the nailing rod 20 can be driven to move upward along an axial nailing direction Z for resetting.

Figure 10:
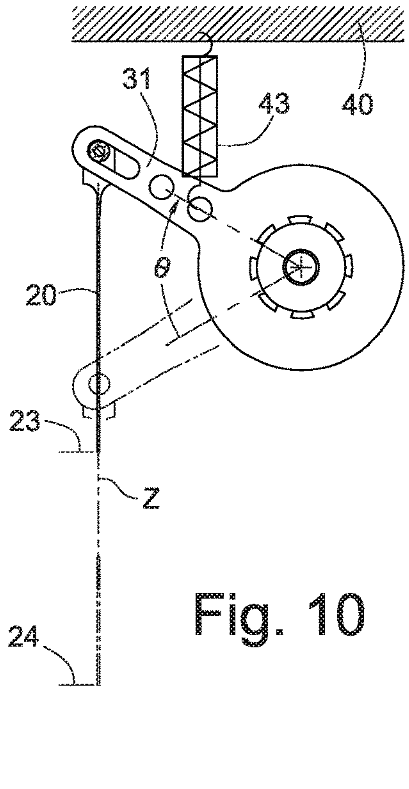
FIG. 10 is a configuration view of an embodiment of the present invention showing how the nailing rod is driven to move upward for resetting.

Third type: In the embodiment of the present invention shown in FIG. 1 to FIG. 8, an elastic component 43 can be additionally configured between the swing arm 31 and the machine body 40 as the fixed end (see FIG. 10). The elastic component 43 can be a tension spring, a compression spring, a torsion spring or other elastic body. When the nailing rod 20 moves downward for nailing, the elastic component 43 can store an elastic force to drive the nailing rod 20 to move along the axial nailing direction Z from the second position 24 upward for resetting to the first position 23, thus drawing back the specific rotation angle θ.

Further, in the above embodiment, a stopper 42 can be fixed inside the machine body 40 (see FIG. 1 and FIG. 8) to help limit the swing angle of the rotor 12. More specifically, no matter the power output end 30 is implemented as a swing arm 31 or a sectorial gear disc 32, at the end of the nailing stroke of the nailing rod 20, the stopper 42 can be configured on the bottom end of the final position after the power output end 30 has swung anti-clockwise for a specific rotation angle to prevent the power output end 30 from further rotation, thus helping to limit the rotor 12 to enhance safety and durability of operation.

Based on the above implementation, the Group A, B, C, D paired configurations may not be necessary for the electro-magnetic mutual action components. In fact, among the above Group A, B, C, D electro-magnetic mutual action components, as long as two pairs are configured between the rotor 12 and the stator 11 along the equal-circumference relative position of the rotor 12, the rotor can be driven to rotate for a specific rotation angle θ. Furthermore, two groups of electro-magnetic mutual action components respectively comprise a hub slot and a magnetic plate. The two hub slots can be configured inside the stator 11 at an angular interval of 180 degrees so that the single coil can be wound to form two wire bundles that can generate electric currents in opposite directions. Moreover, the two magnetic plates can respectively generate lines of magnetic force in opposite polarities and are fixed on the external wall of the rotor an angular interval of 180 degrees to respectively induct the wire bundles with electric currents in different rotational directions. Based on such an implementation, the two magnetic plates can also generate tangential forces in the same rotational directions to drive the rotor to rotate for the specific rotation angle, and consequently drive the nailing rod for nailing. This is clearly stated.

The above embodiments are only used to explain the preferred methods of implementation of the present invention and cannot be construed to limit the scope of patent application for the present invention. Therefore, the present invention shall be based on the patent scope defined in the claims.

The invention claimed is:

1. An internal rotor type nail drive device of an electric nail gun, configured inside a machine body of a nailing machine, comprising:

a nailing rod, slidably configured inside the machine body along a nailing axis, with one end of the nailing rod formed with a transmission part;

a rotary actuator, including a stator fixed inside a machine case, and a rotor rotatably configured inside the stator in a concentric manner, with even groups of electro-magnetic mutual action components configured in pairs between the stator and the rotor, which can respectively generate electricity and a magnetic field for interaction, each group of the electro-magnetic mutual action components comprising a wire bundle that can generate effective magnetic fields of the same current direction, and a magnetic plate that can generate lines of magnetic force to induce mutual action with the wire bundle;

said rotor is formed with a power output end, and the power output end is connected to the transmission part of the nailing rod;

the two neighboring wire bundles can respectively generate electric currents in opposite directions, and the two neighboring magnetic plates can generate lines of magnetic force in opposite polarities so that the two electro-magnetic mutual action components can work together to generate tangential forces in the same rotation direction to drive the rotor to rotate for a specific rotation angle, and, through the power output end and the transmission part, to consequently drive the nailing rod to move for a nailing stroke along an axial nailing direction.

2. The internal rotor type nail drive device of an electric nail gun defined in claim 1, wherein said magnetic plates in each group of the electro-magnetic mutual action components has an arc length for diffusing lines of magnetic force, the specific rotation angle is defined by the effective magnetic field generated by the wire bundles in each group of the electro-magnetic mutual action components and the arc length of the magnetic plate, and the nailing stroke is determined by the specific rotation angle.

3. The internal rotor type nail drive device of an electric nail gun defined in claim 1, wherein said even number of wire bundles are respectively configured inside the stator at intervals and along the direction of a normal line of the stator, and said current direction is perpendicular to said normal line.

4. The internal rotor type nail drive device of an electric nail gun defined in claim 3, wherein said even number of magnetic plates are fixed on the external wall of the rotor in a way that they can respectively induct the currents generated by the wire bundles in the direction of their respective normal lines.

5. The internal rotor type nail drive device of an electric nail gun defined in claim 3, wherein the arc length of said magnetic plate in the direction of the normal line of the stator is larger than, equal to, or less than the arc length of the specific rotation angle.

6. The internal rotor type nail drive device of an electric nail gun defined in claim 3, wherein said even number of wire bundles are formed by winding a wire, the inside of the stator is formed with a flux-guide hole and even number of open type hub slots distributed around the flux-guide hole, through the flux-guide hole, the wire is wound inside the two neighboring hub slots to form at least one coil, said even number of wire bundles are respectively formed by filling at least one of the coils inside two neighboring hub slots.

7. The internal rotor type nail drive device of an electric nail gun defined in claim 6, wherein each of the hub slots has an open type slot opening formed in the direction of a normal line of the stator and communicated with the flux-guide hole, and, through the slot opening, said coil is implanted into the two neighboring hub slots for winding.

8. The internal rotor type nail drive device of an electric nail gun defined in claim 6, wherein the two ends of said wire can conduct a forward current and a backward current from time to time, the forward current is used to drive the nailing rod for nailing, while the backward current is used to drive the nailing rod for resetting.

9. The internal rotor type nail drive device of an electric nail gun defined in claim 6, wherein each of the wire bundles comprises a nailing wire bundle and a resetting wire bundle, said coil comprises at least one nailing coil and at least one resetting coil, and two neighboring hub slots provide space for winding the nailing coil together with the resetting coil to form the nailing wire bundle and resetting wire bundle inside each of the hub slots, said nailing coil is formed by winding a serially connected nailing wire, while said resetting coil is formed by winding a serially connected resetting wire, the two ends of the nailing wire can conduct a forward current to drive the nailing rod for nailing, while the two ends of the resetting wire can conduct a backward current to drive the nailing rod to reset.

10. The internal rotor type nail drive device of an electric nail gun defined in claim 1, wherein said power output end is a swing arm, the two ends of the swing arm are respectively formed with a fixed connection part and a pivotal connection part, the swing arm is fixed on a power output end of the rotor through the fixed connection part, and the swing arm is connected to the transmission part of the nailing rod through the pivotal connection part.

11. The internal rotor type nail drive device of an electric nail gun defined in claim 1, wherein said power output end is a sectorial gear disc, the transmission part of the nailing rod is formed as a gear rack, the two ends of the sectorial gear disc are respectively formed with a fixed connection part and a sectorial tooth part, the sectorial gear disc is fixed on the external wall of the rotor through the fixed connection part, and the sectorial gear disc meshes with the gear rack through the sectorial tooth part.

12. The internal rotor type nail drive device of an electric nail gun defined in claim 1, which further comprises an elastic component connected between the machine body and the power output end, the elastic component generates an elastic force when the nailing rod moves for the nailing stroke, and the elastic force drives the nailing rod to reset along the axial nailing direction.

13. The internal rotor type nail drive device of an electric nail gun defined in claim 1, which further comprises an elastic component connected between the machine body and the nailing rod, the elastic component generates an elastic force when the nailing rod moves for the nailing stroke, and the elastic force drives the nailing rod to reset along the axial nailing direction.

14. The internal rotor type nail drive device of an electric nail gun defined in claim 1, wherein said machine body is further fixed with a stopper to limit the swing angle of the rotor.

* * * * *